United States Patent
Lim (10) Patent No.: US 8,770,915 B2
(45) Date of Patent: Jul. 8, 2014

(54) HYDRAULIC POWER GENERATION MOTOR

(75) Inventor: Byung Doo Lim, Seoul (KR)

(73) Assignee: Myung Ok Hwang, Seoul (KR)

( * ) Notice: Subject to any disclaimer, the term of this patent is extended or adjusted under 35 U.S.C. 154(b) by 425 days.

(21) Appl. No.: 13/122,395

(22) PCT Filed: Jun. 19, 2009

(86) PCT No.: PCT/KR2009/003304
§ 371 (c)(1),
(2), (4) Date: Apr. 14, 2011

(87) PCT Pub. No.: WO2010/041809
PCT Pub. Date: Apr. 15, 2010

(65) Prior Publication Data
US 2011/0187111 A1    Aug. 4, 2011

(30) Foreign Application Priority Data

Oct. 10, 2008  (KR) .................. 10-2008-0099461

(51) Int. Cl.
*F03B 1/04*   (2006.01)

(52) U.S. Cl.
USPC ..................................... 415/3.1; 416/196 R (58) Field of Classification Search
USPC ............. 415/3.1, 4.1, 4.3, 4.5, 53.1, 210.1;
416/196 R, 196 A, 197 A, 197 B; 290/43, 290/54
See application file for complete search history.

(56) References Cited

U.S. PATENT DOCUMENTS

| 267,675 | A | * | 11/1882 | Cory | 415/203 |
| 4,488,055 | A | * | 12/1984 | Toyama | 290/53 |
| 5,137,423 | A | * | 8/1992 | Eda et al. | 415/202 |
| 6,309,179 | B1 | * | 10/2001 | Holden | 415/202 |
| 2008/0219831 | A1 | * | 9/2008 | Yen | 415/1 |

FOREIGN PATENT DOCUMENTS

| JP | 08-042440 A | 2/1996 |
| JP | 2006-144587 A | 6/2006 |
| KR | 10-0578452 B1 | 5/2006 |

OTHER PUBLICATIONS

International Search Report, 2 pages.

* cited by examiner

*Primary Examiner* — Dwayne J White
(74) *Attorney, Agent, or Firm* — Patent Law Group LLP; David C Hsia (57) ABSTRACT

A hydraulic power generation motor includes a tubular body (4) including a pair of coupling flanges (12) formed at opposite ends thereof and an impeller housing (8) formed in an intermediate portion thereof, the coupling flanges (12) being connectable to fluid conduits (10) through which fluid flows. An impeller (38) is rotatably installed within the impeller housing (8) of the tubular body (4), the impeller (38) being designed to be rotated by the fluid and operatively connected to a generator (40) for generating an electric power.

2 Claims, 7 Drawing Sheets

HYDRAULIC POWER GENERATION MOTOR

FIELD OF THE INVENTION

The present invention relates to a hydraulic power generation motor for use in generating electric power and, more particularly, to a hydraulic power generation motor that includes an impeller installed in a public or industrial fluid-flowing conduit and rotated by the kinetic energy of fluid flowing through the conduit. The torque of the impeller is used to rotate a generator operatively connected to the hydraulic power generation motor.

BACKGROUND ART

In general, electric power is generated by hydraulic power generation, steam power generation or atomic power generation. These power generation methods often pose problems of air pollution, ozone layer destruction and water pollution.

In an effort to develop clean energy or alternative energy, scientists over the world have been studying power generation methods that make use of solar heat, wind power and tidal power. Also developed is a power generation method that utilizes water flowing along a river.

The power generation methods using solar heat, wind power, tidal power and river flowing water are advantageous in that they do not contaminate environments and can generate electric power relying upon natural energy. Moreover, such power generation methods assist in saving fossil fuels and underground resources which have been extensively used to generate electric energy.

However, the power generation methods using natural energy suffer from the following drawbacks.

A solar generation device mainly installed in buildings or houses is bulky and costly to install. In case of bad weather, the solar generation device is hard to generate electric power. These shortcomings make it difficult to supply electric power in a stable manner. In other words, the power generation methods using natural energy such as solar heat, wind power, tidal power and river flowing water are heavily affected by weather conditions.

Korean Patent No. 10-0780316 discloses a hydraulic power generation device that uses, as its drive power source, the hydraulic energy of the drinking water, agricultural water or industrial water flowing out from a building water tank, a water purification facility or a reservoir.

The hydraulic power generation device cited above is designed to generate electric power using the kinetic energy of flowing water supplied from a water source such as a dam, a river or a reservoir to a water collection tower or a water tank installed in a school, a building or a factory.

In the hydraulic power generation device, the energy of flowing water acts on vanes and rotates a rotor. The torque generated at this time is transferred to a generator so that the generator can be rotationally driven to generate electric power.

However, the vanes employed in the hydraulic power generation device suffer from a number of problems, including the noise caused by the wear of vane hinges, the premature wear of the vanes occurring due to the sliding contact of the vanes with the inner surface of a casing, the noise generated when the vanes are unfolded into contact with the support claws of the rotor and the water leakage through the gaps around the vanes. In addition, the rotor having the support claws is difficult to manufacture and the number of fabrication steps of the rotor are increased. Since the vanes are arranged inside the casing in a foldable manner, the casing has a complex structure and involves a difficulty in the manufacture thereof. This leads to reduced productivity. The inlet and outlet ports arranged at the opposite sides of the casing make the device quite complicated.

DETAILED DESCRIPTION OF THE INVENTION

Technical Problems

In view of the problems noted above, it is an object of the present invention to provide a hydraulic power generation motor capable of generating electric power using the linear kinetic energy of fluid flowing through a fluid conduit.

Another object of the present invention is to provide a hydraulic power generation motor that can be manufactured in many different sizes and can be installed on a fluid conduit in plural numbers.

A further object of the present invention is to provide a hydraulic power generation motor that can be used regardless of the characteristics of fluid such as tap water, oil or waste water.

A still further object of the present invention is to provide a hydraulic power generation motor capable of enjoying enhanced durability and reduced noise generation through the improvement in the structure of an impeller.

Solution to the Technical Problems

In one aspect of the present invention, there is provided a hydraulic power generation motor, including:

a tubular body including a pair of coupling flanges formed at opposite ends thereof and an impeller housing formed in an intermediate portion thereof, the coupling flanges being connectable to fluid conduits through which fluid flows; and an impeller rotatably installed within the impeller housing of the tubular body, the impeller being designed to be rotated by the fluid and operatively connected to a generator for generating an electric power, wherein the impeller housing includes: a circumferential portion having access openings formed at side surfaces thereof; a pair of housing covers attached to the side surfaces to close the access openings, each of the housing covers having a shaft-receiving hole; a first bearing cover attached to one of the housing covers to close the shaft-receiving hole and designed to hold a bearing for rotatably supporting the impeller; and a second bearing cover attached to the other housing cover and provided with a through-hole.

In the hydraulic power generation motor, the impeller may include an impeller shaft inserted into the shaft-receiving holes of the housing covers and operatively connected to the generator, a plurality of vanes extending in a tangential direction from an outer circumferential surface of the impeller shaft and having rounded edges, and a plurality of reinforcing plates arranged to interconnect the vanes in a spaced-apart relationship with the impeller shaft.

With the present invention, the hydraulic power generation motor can be installed in the fluid conduits existing in any place. This makes it possible to generate electric power using the fluid flowing through the fluid conduits. The hydraulic power generation motor can be installed in the fluid conduits in plural numbers, which assists in generating a required amount of electric power. The hydraulic power generation motor installed in the fluid conduits does not require any drive power and therefore does not consume any external electric power. The hydraulic power generation motor is easy to install, effective in reducing noises and convenient to manufacture and repair. The hydraulic power generation motor can be standardized and manufactured in a large quantity.

BEST MODE FOR CARRYING OUT THE INVENTION

Hereinafter, one preferred embodiment of the present invention will be described in detail with reference to the accompanying drawings.

Figure 1:
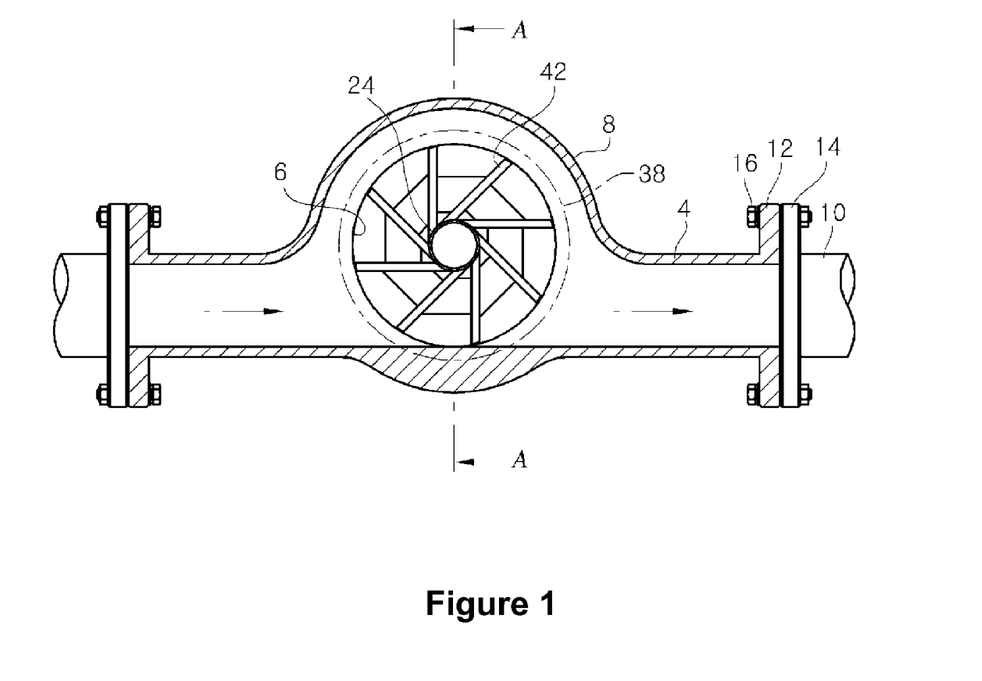
FIG. 1 is a view showing a hydraulic power generation motor in accordance with one embodiment of the present invention.
Figure 2:
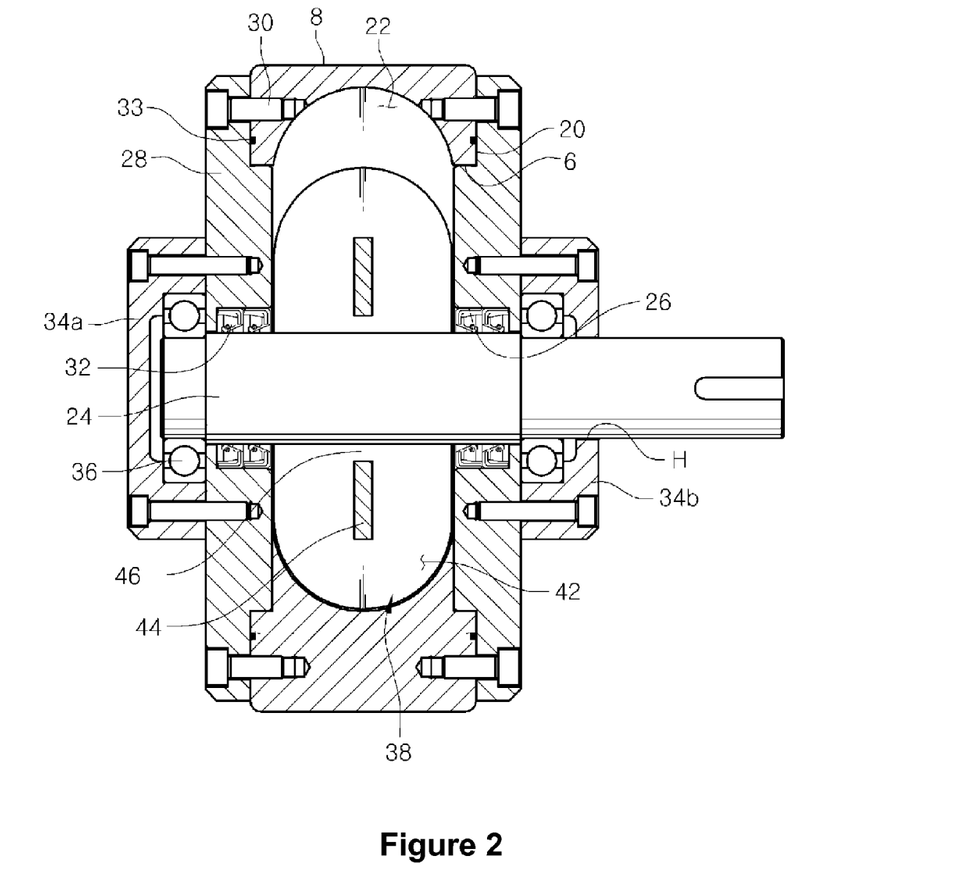
FIG. 2 is a section view taken along line A-A in FIG. 1.

As shown in FIGS. 1 and 2, the hydraulic power generation motor according to the present invention includes a tubular body 4 through which fluid can flow. The tubular body 4 is provided with an impeller housing 8 formed in the middle section thereof. The impeller housing 8 is formed into a generally circular shape and has a pair of access openings 6 at the opposite sides thereof.

The tubular body 4 is further provided with coupling flanges 12 formed at the opposite ends thereof. The coupling flanges 12 are used in coupling the tubular body 4 to other fluid conduits 10. The coupling flanges 12 are fastened to the flanges 14 of the fluid conduits 10 by means of fasteners such as bolts and nuts.

Figure 3:
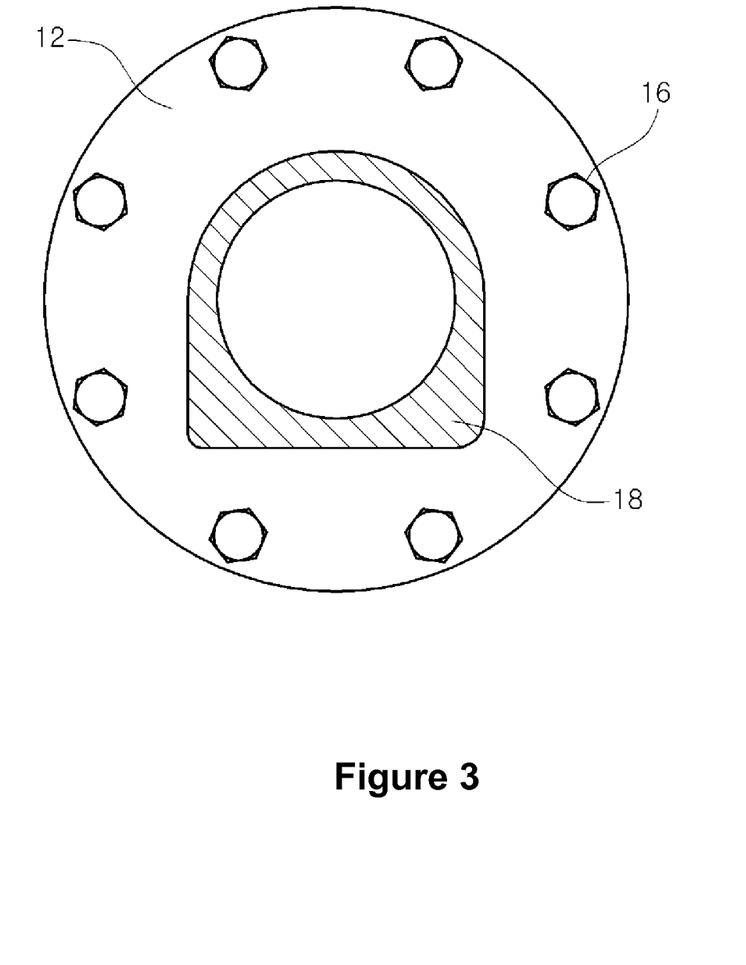
FIG. 3 is a view showing a coupling flange employed in the hydraulic power generation motor.

As can be seen in FIG. 3, the tubular body 4 is manufactured by casting so that it can have a planar inner bottom surface and a curved inner top surface. In order for fluid to move fast through the tubular body 4, it is preferred that the inner diameter of the tubular body 4 be set smaller than the inner diameter of the fluid conduits 10. The tubular body 4 has a reinforcing wall portion 18 formed to assure increased strength and durability.

The impeller housing 8 includes a circular circumferential wall portion 20 formed to define the access openings 6. The impeller housing 8 has a thickness substantially equal to the outer diameter of the tubular body 4. A chamber 22 having a specified diameter is defined within the impeller housing 8. Housing covers 28 are fixed to the side surfaces of the circumferential wall portion 20 with seal rings 33 for prevention of fluid leakage interposed therebetween. The access openings 6 are closed by the housing covers 28 and are opened when assembling or disassembling an impeller 38 to be described later.

Each of the housing covers 28 has a shaft-receiving hole 26 into which an impeller shaft 24 is inserted. A seal ring 32 is arranged in the shaft-receiving hole 26 to assure fluid tightness around the impeller shaft 24. Use of the seal ring 32 makes it possible to prevent leakage of the fluid existing within the chamber 22.

The shaft-receiving hole 26 of the housing covers 28 are covered by bearing covers fastened to the housing covers 28 with bolts 30. The bearing covers hold bearings 36 for rotatably supporting the impeller shaft 24 and include a blind-type first bearing cover 34a and a second bearing cover 34b having a shaft passage hole H. The first bearing cover 34a is attached to one of the housing covers 28 to hide one side of the impeller shaft 24. The second bearing cover 34b is attached to the other housing cover 28. The impeller shaft 24 is inserted through the second bearing cover 34b with one end thereof exposed to the outside so that a generator 40 (see FIG. 6) can be operatively connected to the impeller shaft 24. The housing covers 28 are fixed to the circumferential portion 20 of the impeller housing 8 by means of bolts 30. The first and second bearing covers 34a and 34b are secured to the housing covers 28 by means of bolts 30.

Figure 4:
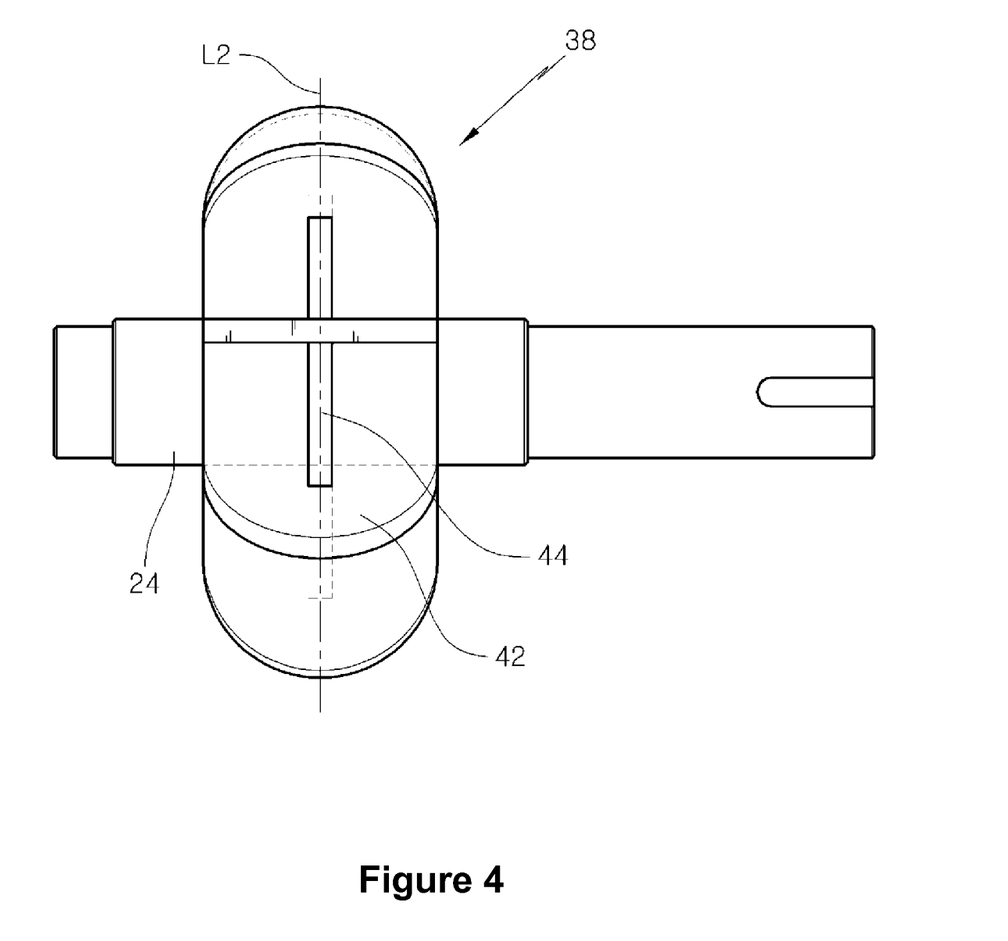
FIG. 4 is an enlarged view showing an impeller employed in the hydraulic power generation motor.
Figure 5:
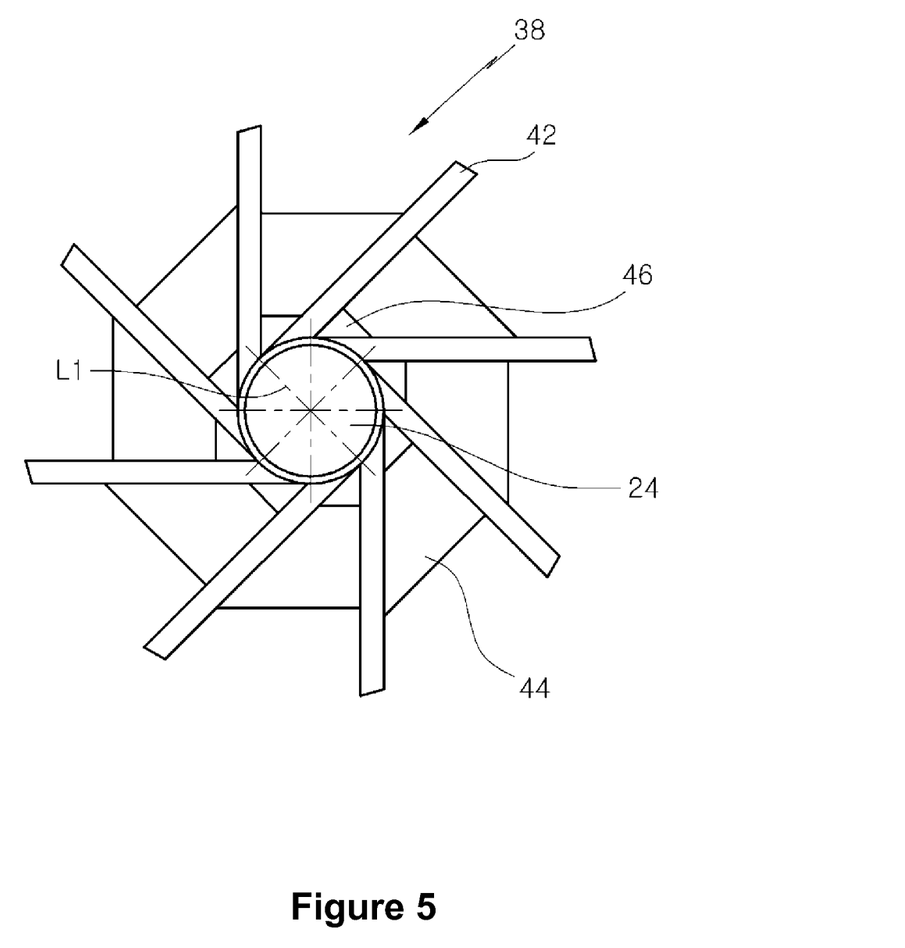
FIG. 5 is an end view of the impeller shown in FIG. 4.

The impeller 38 is rotatably installed in the impeller housing 8 so that it can be rotated by the kinetic energy of fluid flowing through the tubular body 4. As shown in FIGS. 4 and 5, the impeller 38 includes an impeller shaft 24 operatively connected to the generator 40. The impeller shaft 24 is inserted through the shaft-receiving holes 26 of the housing covers 28 and rotatably supported by the bearings 36.

The impeller 38 further includes a plurality of vanes 42 circumferentially arranged along the outer circumferential surface of the impeller shaft 24 substantially at a right angle with respect to the center axis of the impeller shaft 24. The vanes 42 extend in a tangential direction from the outer circumferential surface of the impeller shaft 24 at a right angle with respect to reference lines L1 equally dividing the impeller shaft 24. The vanes 42 are oriented so that they can rotate counterclockwise. Each of the vanes 42 has a rounded edge. This ensures that the vanes 42 rotate smoothly with reduced loss of fluid pressure.

The impeller 38 further includes a plurality of reinforcing plates 44 arranged between the vanes 42. The reinforcing plates 44 are formed on a plane L2 perpendicular to the center axis of the impeller shaft 24 and are designed to interconnect the adjoining vanes 42. The reinforcing plates 44 are spaced apart from the outer circumferential surface of the impeller shaft 24.

The vanes 42 are fixed to the impeller shaft 24 at a specified angle so that they can convert the kinetic energy of fluid to the rotational movement of the impeller shaft 24. The reinforcing plates 44 serves to protect the vanes 42 from the impact applied by the fluid flowing through the tubular body 4. Since gaps 46 exist between the reinforcing plates 44 and the impeller shaft 24, the impact of fluid applied to the vanes 42 are lessened by the reinforcing plates 44.

Figure 6:
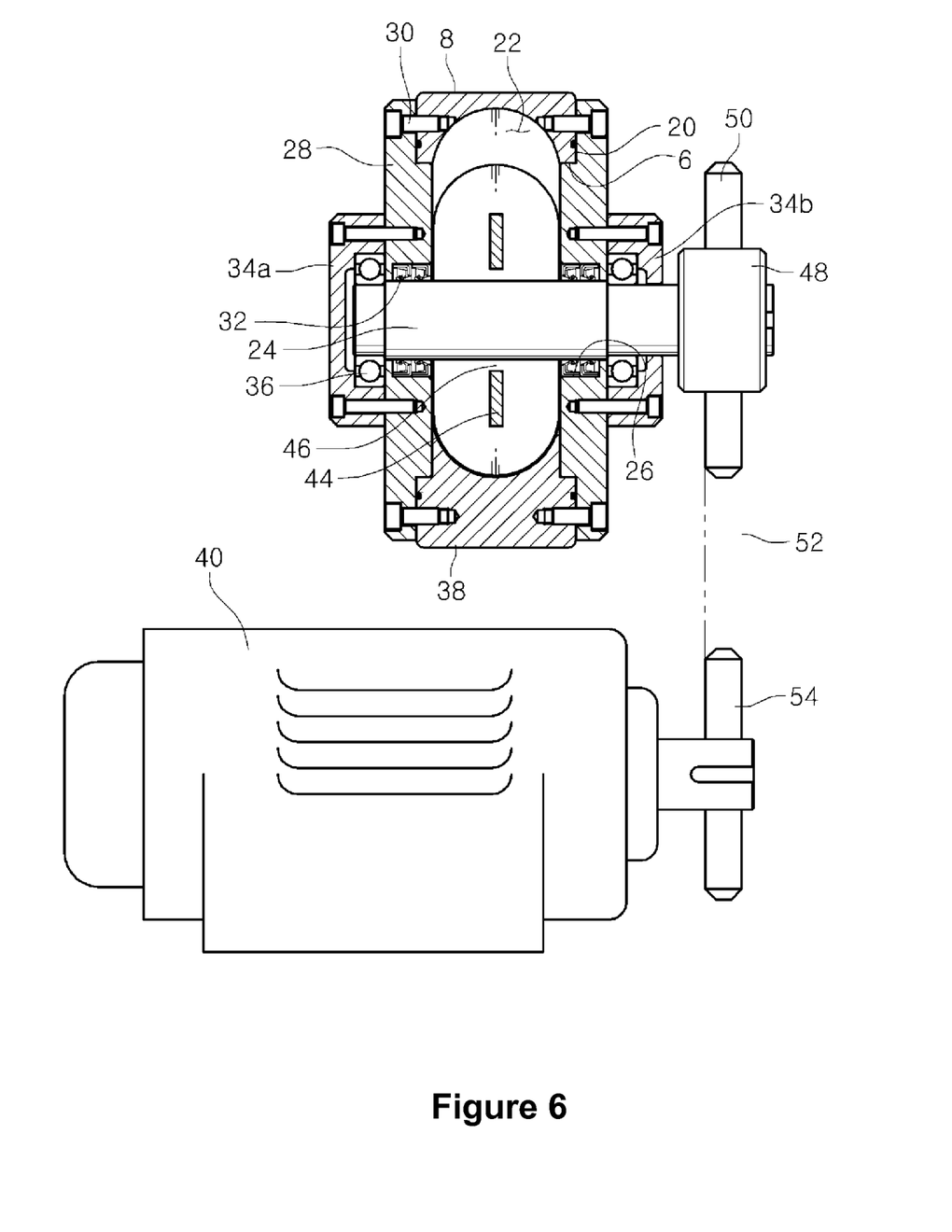
FIG. 6 is a view showing a generator operatively connected to the hydraulic power generation motor.
Figure 7:
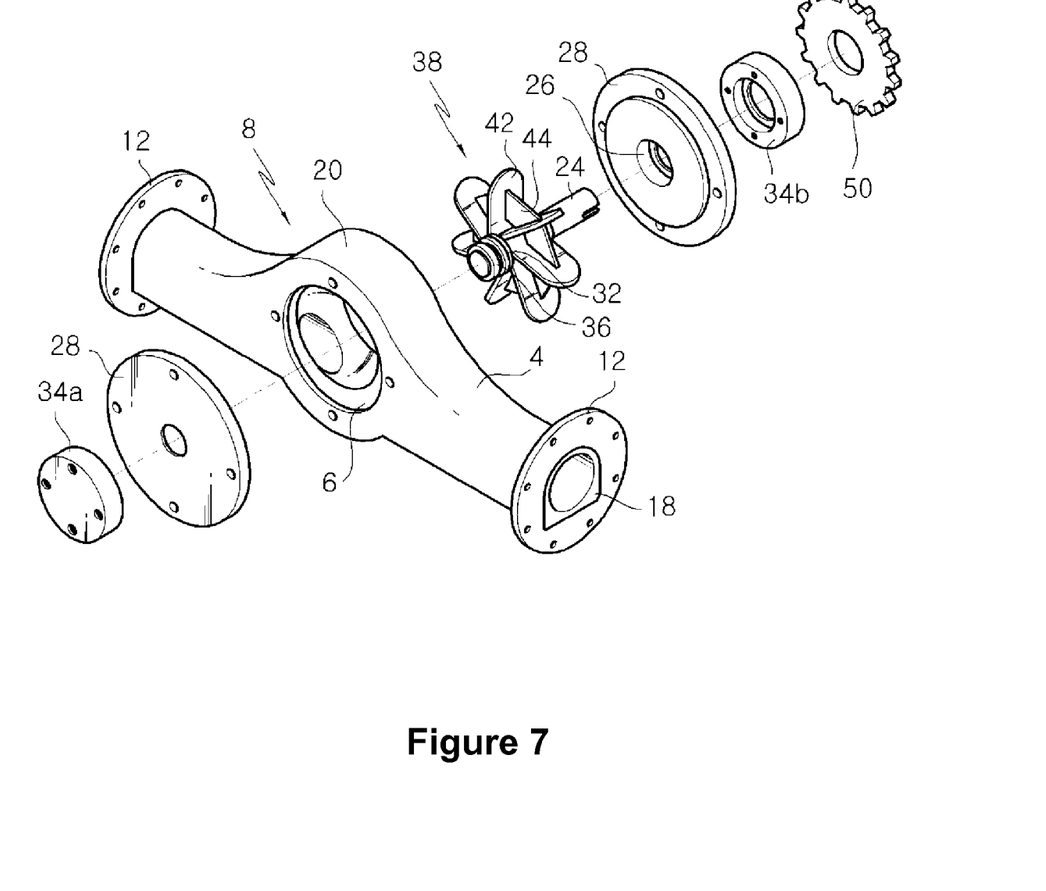
FIG. 7 is an exploded perspective view of the hydraulic power generation motor.

Referring to FIG. 6, a generator 40 is operatively connected to the hydraulic power generation motor of the present invention. For this purpose, the hydraulic power generation motor includes a gear box 48 arranged at one end of the impeller shaft 24. The gear box 48 is provided with a chain sprocket 50. The generator 40 includes a drive shaft 54 and a chain sprocket 50 mounted to the drive shaft 54. The chain sprocket 50 of the gear box 48 is operatively connected to the chain sprocket 50 of the generator 40 through a chain 52. Thus, the rotation of the hydraulic power generation motor is transferred to the generator 40 by way of the chain 52. This makes it possible for the generator 40 to generate electric power. If necessary, the chain sprockets 50 and the chain 52 for operatively interconnecting the hydraulic power generation motor and the generator 40 may be replaced by pulleys and a belt.

Next, description will be made on how to assemble the hydraulic power generation motor and how the hydraulic power generation motor works.

A method of assembling the hydraulic power generation motor will be described first. The impeller 38 is inserted into the chamber 22 of the impeller housing 8 of the tubular body 4 through the access openings 6. After the impeller 38 is positioned in place, the housing covers 28 are attached to the impeller housing 8 so that they can cover the access openings 6 of the impeller housing 8. At this time, the impeller shaft 24 is first inserted through the shaft-receiving holes 26 of the housing covers 28. Then, the housing covers 28 are brought into alignment with the access openings 6 and fixed to the circumferential portion 20 by bolts 30. As a result, the chamber 22 of the impeller housing 8 is closed by the housing covers 28.

Once the housing covers 28 are attached to the circumferential portion 20, one of the bearings 36 is fitted to one end of the impeller shaft 24 to rotatably support the impeller shaft 24. One end of the impeller shaft 24 exposed through the shaft-receiving hole 26 of one of the housing covers 28 is covered with the first bearing cover 34a which in turn is fixed to the corresponding housing cover 28 by bolts 30. Then, the other bearing 36 is fitted to the other end of the impeller shaft 24 which is to be operatively connected to the generator 40. The second bearing cover 34b having the shaft insertion hole H is fitted to the impeller shaft 24 and fixed to the other housing cover 28 by bolts 30.

The hydraulic power generation motor thus assembled is coupled with the existing or newly-installed fluid conduits 10 through the use of the coupling flanges 12 of the tubular body 4. Thereafter, the gear box 48 having the chain sprocket 50 is mounted to the exposed end of the impeller shaft 24. The chain sprocket 50 of the gear box 48 is connected to the chain sprocket 50 of the generator 40 using the chain 52.

After the generator 40 is operatively connected to the hydraulic power generation motor, fluid is allowed to flow through the tubular body 4 by opening the fluid conduits 10. The fluid flows fast through the tubular body 4 because the inner diameter of the tubular body 4 is smaller than that of the fluid conduits 10. The fluid pushes the vanes 42 and rotates the impeller 38 while flowing through the chamber 22 of the impeller housing 8. Consequently, the impeller shaft 24 is rotated at a high speed by the kinetic energy of the fluid applied to the vanes 42. The rotation of the impeller 38 is transferred to the drive shaft 54 of the generator 40 through the chain sprocket 50 of the gear box 48, the chain 52 and the chain sprocket 50 of the generator 40. As a consequence, the generator 40 is rotationally driven to generate electric power which in turn is charged in a battery or directly supplied to electric devices. If circumstances permit, the hydraulic power generation motor may be installed in the fluid conduits 10 in plural numbers to continuously generate electric power.

INDUSTRIAL APPLICABILITY

The hydraulic power generation motor of the present invention can be installed in the fluid conduits to generate torque required in driving a generator. The electric power generated by the generator is used for public or industrial purposes. The hydraulic power generation motor can find its application in the field of power generation industry or alternative energy industry.

The invention claimed is:

1. A hydraulic power generation motor, comprising:
   a tubular body (4) including a pair of coupling flanges (12) formed at opposite ends thereof and an impeller housing (8) formed in an intermediate portion thereof, the coupling flanges (12) being connectable to fluid conduits (10) through which fluid flows; and
   an impeller (38) rotatably installed within the impeller housing (8) of the tubular body (4), the impeller (38) being designed to be rotated by the fluid and operatively connected to a generator (40) for generating an electric power,
   wherein the impeller housing (8) includes: a circumferential portion (20) having access openings (6) formed at side surfaces thereof; a pair of housing covers (28) attached to the side surfaces to close the access openings (6), each of the housing covers (28) having a shaft-receiving hole (26); a first bearing cover (34a) attached to one of the housing covers (28) to close the shaft-receiving hole (26) and designed to hold a bearing (36) for rotatably supporting the impeller (38); and a second bearing cover (34b) attached to the other housing cover (28) and provided with a through-hole;
   wherein the impeller (38) includes an impeller shaft (24) inserted into the shaft-receiving holes (26) of the housing covers (28) and operatively connected to the generator (40), a plurality of vanes extending in a tangential direction from an outer circumferential surface of the impeller shaft (24) and having rounded edges, and a plurality of reinforcing plates (44) arranged to interconnect the vanes (42) in a spaced-apart relationship with the impeller shaft (24) so gaps (46) exist between the reinforcing plates (44) and the impeller shaft (24).

2. The hydraulic power generation motor of claim 1, wherein at least part of the tubular body (4) comprises a planar bottom surface and a curved top surface.

* * * * *